US010657651B2

(12) United States Patent
Li et al.

(10) Patent No.: US 10,657,651 B2
(45) **Date of Patent: *May 19, 2020**

(54) SYSTEMS AND METHODS FOR DETECTION OF SIGNIFICANT AND ATTRACTIVE COMPONENTS IN DIGITAL IMAGES

(71) Applicant: THE PENN STATE RESEARCH FOUNDATION, University Park, PA (US)

(72) Inventors: Jia Li, State College, PA (US); James Z. Wang, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/212,942

(22) Filed: Dec. 7, 2018

(65) Prior Publication Data

US 2019/0114780 A1 Apr. 18, 2019

Related U.S. Application Data

(63) Continuation of application No. 15/617,479, filed on Jun. 8, 2017, now Pat. No. 10,186,040.

(Continued)

(51) Int. Cl.
*G06K 9/36* (2006.01)
*G06T 7/143* (2017.01)

(Continued)

(52) U.S. Cl.
CPC ................ *G06T 7/143* (2017.01); *G06T 7/11* (2017.01); *G06T 7/12* (2017.01); *G06T 7/162* (2017.01);

(Continued)

(58) Field of Classification Search
CPC .................... G06T 7/143; G06T 7/162; G06T 2207/10024; G06T 7/12; G06T 7/11;

(Continued)

(56) References Cited

U.S. PATENT DOCUMENTS 8,755,578 B1 6/2014 Smolyar
10,186,040 B2 * 1/2019 Li ............................ G06T 7/11

(Continued)

OTHER PUBLICATIONS

Avraham et al. "Esaliency (Extended Saliency): Meaningful Attention Using Stochastic Image Modeling." IEEE, Mar. 6, 2009, Manuscript revised Jan. 19, 2009.

(Continued)

*Primary Examiner* — Amir Alavi
(74) *Attorney, Agent, or Firm* — Dinsmore & Shohl LLP

(57) ABSTRACT

Systems, methods, and computer-readable media for electronically assessing a visual significance of pixels or regions in an electronic image are disclosed. A method includes receiving the electronic image, performing a composition analysis on the electronic image, the composition analysis includes partitioning the electronic image into a plurality of segments or a plurality of parts, constructing an attributed composition graph having a plurality of nodes, where each node corresponds to a segment or a part and where each node includes one or more attributes, modeling the visual significance of the electronic image based on the attributed composition graph using a statistical modeling process or a computational modeling process to obtain a plurality of values, and constructing a composition significance map having a significance score for each segment or each part according to the values obtained from the statistical modeling process or the computational modeling process.

20 Claims, 7 Drawing Sheets

RECEIVE ELECTRONIC IMAGE — 305
PERFORM COMPOSITION ANALYSIS — 310
MODEL VISUAL SIGNIFICANCE OF ELECTRONIC IMAGE — 315
CONSTRUCT ATTRIBUTED COMPOSITION GRAPH — 320
CONSTRUCT COMPOSITION SIGNIFICANCE MAP — 325
COMBINE RESULTS OF COMPOSITION ANALYSIS, EDGE DETECTION REULTS, AND SEGMENTS/PARTS — 330
CONSTRUCT INTEGRATED DIFFERENTIAL COMPOSITION SIGNIFICANCE MAP — 335
DETERMINE CORE REGION — 340
DETERMINE CANDIDATE CROPPED REGIONS — 345
SELECT CROPPED REGION — 350

Related U.S. Application Data

(60) Provisional application No. 62/347,850, filed on Jun. 9, 2016.

(51) Int. Cl.
*G06T 7/11* (2017.01)
*G06T 7/12* (2017.01)
*G06T 7/194* (2017.01)
*G06T 7/162* (2017.01)

(52) U.S. Cl.
CPC .... *G06T 7/194* (2017.01); *G06T 2207/10024* (2013.01)

(58) Field of Classification Search
CPC .... G06T 7/194; G06K 9/6291; G06K 9/6216; G06K 9/6296; G06K 9/72
See application file for complete search history.

(56) References Cited

U.S. PATENT DOCUMENTS

2009/0040367 A1 2/2009 Zakrzewski et al.
2009/0320669 A1* 12/2009 Piccionelli ........... G10H 1/0058 84/609
2012/0323738 A1 12/2012 Gokturk et al.
2013/0135315 A1 5/2013 Bares et al.
2013/0310122 A1* 11/2013 Piccionielli ......... G07F 17/3272 463/2
2014/0088856 A1* 3/2014 Wouhaybi ........... G06F 16/9537 701/118
2014/0333637 A1* 11/2014 Blanco ................... G09G 5/006 345/520
2015/0016719 A1* 1/2015 Tam ..................... G06K 9/2054 382/166
2015/0117783 A1* 4/2015 Lin ...................... G06K 9/4671 382/195
2015/0117784 A1* 4/2015 Lin ...................... G06K 9/4671 382/195
2016/0350954 A1* 12/2016 Agarwala ............... G06T 11/60
2017/0358090 A1* 12/2017 Li ............................ G06T 7/11
2018/0107342 A1* 4/2018 Deets, Jr. .............. G06F 3/0481
2019/0114780 A1* 4/2019 Li ............................ G06T 7/11

OTHER PUBLICATIONS

Harel et al. “Graph-Based Visual Saliency.” Advances in Neural Information Processing Systems 19, NIPS, 2006, pp. 545-552.
Jiang et al. “Salient Object Detection: A Discriminative Regional Feature Integration Approach.” CVPR, 2013, https://site.google.com/sites/jianghz88/saliency_drfi.
Li. “Agglomerative Connectivity Constrained Clustering for Image Segmentation.” Statistical Analysis and Data Mining, Jan. 18, 2011.
Li et al. “Photo Composition Feedback and Enhancement—Exploiting Spatial Design Categories and the Notan Dark Light Principle.” Mobile Cloud Visual Media Computing. Springer International Publishing, 2015.
PCT International Search Report and Written Opinion of the International Searching Authority for PCT/US17/036579, dated Aug. 29, 2017, 9 pages.
Samii et al. “Data-Driven Automatic Cropping Using Semantic Composition Search.” Computer Graphics forum, 2015, vol. 34, No. 1. pp. 141-151.
Yan et al. “Learning the Change for Automatic Image Cropping.” Computer Vision Foundation, 2013, Authoritative Version available in IEEE Xplore.
Yao et al. “OSCAR: On-Site Composition and Aesthetics Feedback through Exemplars for Photographers.” International Journal of Computer Vision, 2012, vol. 96, No. 3. pp. 353-383.
Zhang et al. “Probabilistic Graphlet Transfer for Photo Cropping.” IEEE Transactions on Image Processing, Feb. 2013, vol. 22, No. 2. pp. 802-815.

* cited by examiner

FIG. 7

SYSTEMS AND METHODS FOR DETECTION OF SIGNIFICANT AND ATTRACTIVE COMPONENTS IN DIGITAL IMAGES

REFERENCE TO RELATED APPLICATION

This application is a continuation of and claims priority to U.S. patent application Ser. No. 15/617,479, filed Jun. 8, 2017 and entitled "SYSTEMS AND METHODS FOR DETECTION OF SIGNIFICANT AND ATTRACTIVE COMPONENTS IN DIGITAL IMAGES," which claims priority to U.S. Provisional Patent Application Ser. No. 62/347,850, filed Jun. 9, 2016 and entitled "ULTRA-FAST COMPUTERIZED DETECTION OF SIGNIFICANT AND ATTRACTIVE COMPONENTS IN IMAGES," the entire contents of each are incorporated herein by reference.

STATEMENT REGARDING FEDERALLY SPONSORED RESEARCH OR DEVELOPMENT

This invention was made with government support under Grant No. DMS1521092 awarded by the National Science Foundation. The Government has certain rights in the invention.

FIELD

The present invention is related to electronic image analysis and, more specifically, to a system for electronic detection of significant and aesthetic regions in electronic images.

BACKGROUND

Visual attention modeling is generally used to address the observed and/or predicted behavior of human and non-human visual attention such that photographic related applications (e.g., displaying an image on an electronic display) can be improved by producing images that will be more likely to capture and/or retain the attention of an observer. Such modeling may utilize visual saliency evaluation, which focuses on detecting regions in an image that are highly dissimilar from various other parts of the image. However, such modeling may fail in instances where an image does not contain highly dissimilar regions or when the highly dissimilar regions are not visually significant or aesthetically attractive.

Accordingly, a need exists for visual attention modeling that more accurately observes and/or predicts attention and improves use of the observed and/or predicted attention in presenting photographic related data to and/or storing the data for users of electronic devices.

SUMMARY

In an embodiment, a method of electronically assessing a visual significance of pixels or regions in an electronic image includes receiving, by a processing device, the electronic image and performing, by the processing device, a composition analysis on the electronic image. The composition analysis includes partitioning the electronic image into a plurality of segments or a plurality of parts. The method further includes constructing, by the processing device, an attributed composition graph comprising a plurality of nodes. Each node of the plurality of nodes corresponds to a segment of the plurality of segments or a part of the plurality of parts and wherein each node of the plurality of nodes comprises one or more attributes. The method further includes modeling, by the processing device, the visual significance of the electronic image based on the attributed composition graph using a statistical modeling process or a computational modeling process to obtain a plurality of values and constructing, by the processing device, a composition significance map comprising a significance score for each segment of the plurality of segments or each part of the plurality of parts according to the values obtained from the statistical modeling process or the computational modeling process.

In another embodiment, a system for electronically assessing a visual significance of pixels or regions in an electronic image includes a processing device and a non-transitory, processor-readable storage medium in communication with the processing device. The non-transitory, processor-readable storage medium includes one or more programming instructions stored thereon that, when executed, cause the processing device to receive the electronic image and perform a composition analysis on the electronic image. The composition analysis includes partitioning the electronic image into a plurality of segments or a plurality of parts. The non-transitory, processor-readable storage medium further includes one or more programming instructions stored thereon that, when executed, cause the processing device to construct an attributed composition graph comprising a plurality of nodes. Each node of the plurality of nodes corresponds to a segment of the plurality of segments or a part of the plurality of parts and each node of the plurality of nodes comprises one or more attributes. The non-transitory, processor-readable storage medium further includes one or more programming instructions stored thereon that, when executed, cause the processing device to model the visual significance of the electronic image based on the attributed composition graph using a statistical modeling process or a computational modeling process to obtain a plurality of values and construct a composition significance map comprising a significance score for each segment of the plurality of segments or each part of the plurality of parts according to the values obtained from the statistical modeling process or the computational modeling process.

In yet another embodiment, a non-transitory, processor readable storage medium includes one or more programming instructions that, when executed by a processing device, cause the processing device to receive the electronic image and perform a composition analysis on the electronic image. The composition analysis includes partitioning the electronic image into a plurality of segments or a plurality of parts. The non-transitory, processor readable storage medium further includes one or more programming instructions that, when executed by a processing device, cause the processing device to construct an attributed composition graph including a plurality of nodes. Each node of the plurality of nodes corresponds to a segment of the plurality of segments or a part of the plurality of parts and each node of the plurality of nodes comprises one or more attributes. The non-transitory, processor readable storage medium further includes one or more programming instructions that, when executed by a processing device, cause the processing device to model the visual significance of the electronic image based on the attributed composition graph using a statistical modeling process or a computational modeling process to obtain a plurality of values and construct a composition significance map comprising a significance score for each segment of the plurality of segments or each part of the plurality of parts according to the values obtained from the statistical modeling process or the computational modeling process.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 7 depicts illustrative examples of results for automatically cropped images according to one or more embodiments shown and described herein.

DETAILED DESCRIPTION

Figure 1:
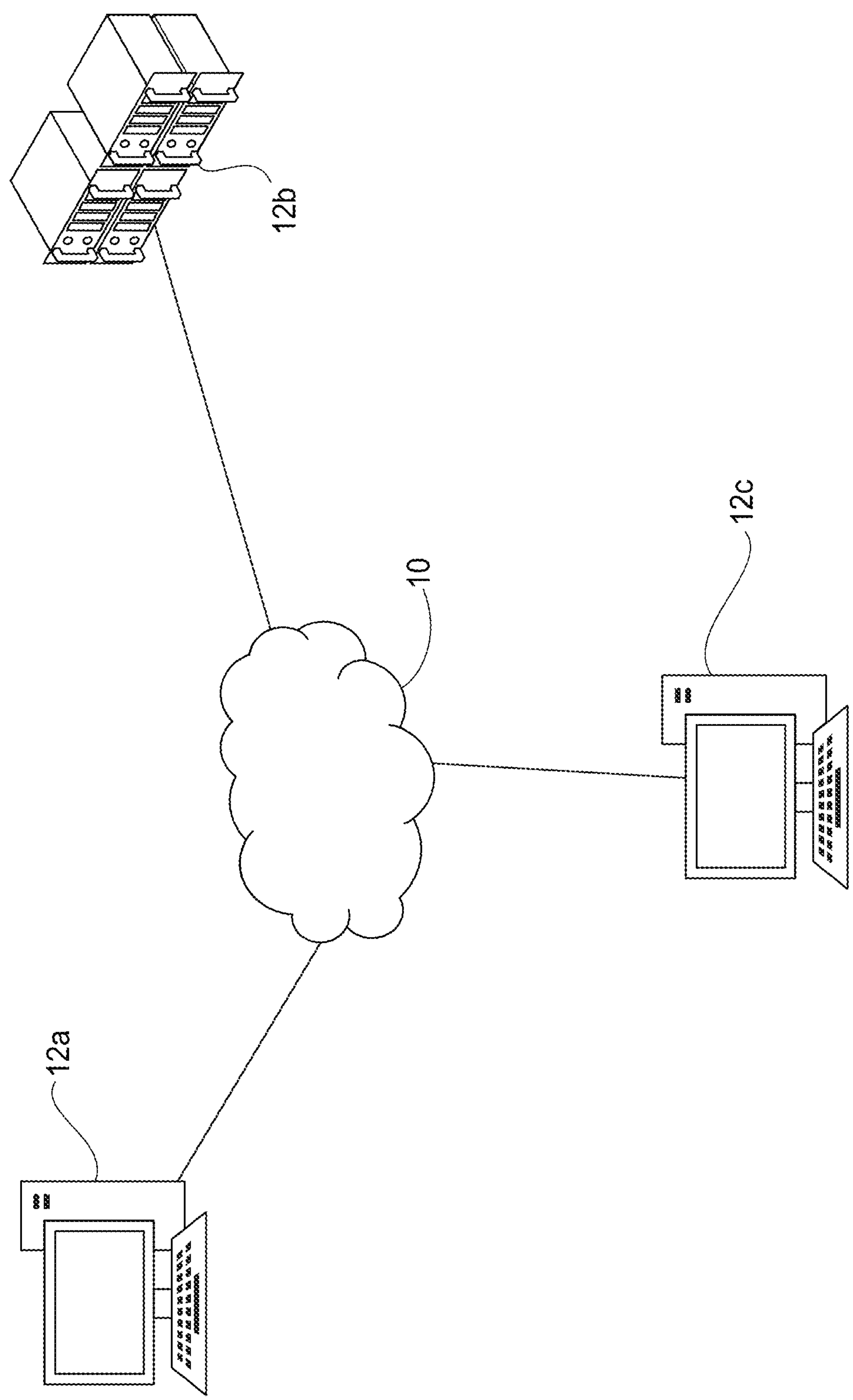
FIG. 1 schematically depicts an illustrative computing network for a system for electronically assessing a visual significance of pixels or regions in an electronic image according to one or more embodiments shown and described herein.

Reference will now be made in detail to embodiments of the present disclosure, examples of which are illustrated in the accompanying drawings. Whenever possible, the same reference numerals will be used throughout the drawings to refer to the same or like parts. Embodiments of the present disclosure are directed to systems and methods for detecting significant and aesthetic regions in images, which, in turn, can be used to improve computer functioning in providing images to human and non-human observers.

Visual attention modeling focuses on visual saliency, which is the ability of a vision system (human, non-human animal, and machine) to select a certain subset of visual information for further processing. This mechanism may serve as a filter for selecting a particular subset of the information in an image (e.g., "interesting" information in an image) relating to current behaviors or tasks to be processed, all while ignoring other information in the image (e.g., "irrelevant" information in an image).

Salient object detection may be useful for electronic vision because it may provide a fast solution for completing several complex processes. Salient object detection functions by detecting the most salient and attention-grabbing object in a scene and segmenting the whole of that object. The dissimilarity can be based on local contrast or global contrast The resulting output is a map where the intensity of each pixel represents the probability of that pixel belonging to the salient object. Salient object detection differs from traditional image segmentation in that salient object detection models segment only salient foreground object(s) from the background while general segmentation algorithms partition an image into regions of coherent properties.

Salient object detection may be particularly useful in improving further computing tasks, including, but not limited to, object detection and recognition, image compression, video summarization, and photo collages.

However, salient object detection is generally a figure/ground segmentation problem, and the goal is to only segment the salient foreground object from the background. This differs from the traditional image segmentation problem that aims to partition an image into perceptually coherent regions. However, salient object detection may not be very meaningful or useful in some instances, such as, for example, in instances where the target image is a landscape picture without any particular objects featured.

In contrast, in compositional significance analysis, details are often nuances. This is evident in the practice of art. For instance, in the recommended notan study before creating a painting, fragmented masses and details are to be avoided. Details in particular are seen as distracting and damaging for achieving a solid foundation for a pleasant composition, which is believed to strike an influential impression on the viewer even before he grasps the semantics and all the way through.

Referring now to the drawings, FIG. 1 depicts an illustrative computing network that depicts components for a system for electronically assessing a visual significance of pixels or regions in an electronic image according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12*a*, a server computing device 12*b*, and an administrator computing device 12*c*.

The user computing device 12*a* may generally be used as an interface between a user and the other components connected to the computer network 10. Thus, the user computing device 12*a* may be used to perform one or more user-facing functions, such as receiving one or more inputs from a user or providing information to the user. Accordingly, the user computing device 12*a* may include at least a display and/or input hardware. Additionally, included in FIG. 1 is the administrator computing device 12*c*. In the event that the server computing device 12*b* requires oversight, updating, or correction, the administrator computing device 12*c* may be configured to provide the desired oversight, updating, and/or correction. The administrator computing device 12*c* may also be used to input additional data into a corpus of data stored on the server computing device 12*b*.

The server computing device 12*b* may receive data from one or more sources, generate data, store data, index data, perform electronic image analysis, and/or provide data to the user computing device 12*a*.

It should be understood that while the user computing device 12*a* and the administrator computing device 12*c* are depicted as personal computers and the server computing device 12*b* is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12*a*, server computing device 12*b*, and administrator computing device 12*c* may represent a plurality of computers, servers, databases, components, and/or the like. In addition, each of the user computing device 12*a*, the server computing device 12*b*, and the administrator computing device 12*c* can be used to carry out any tasks or methods described herein.

Figure 2:
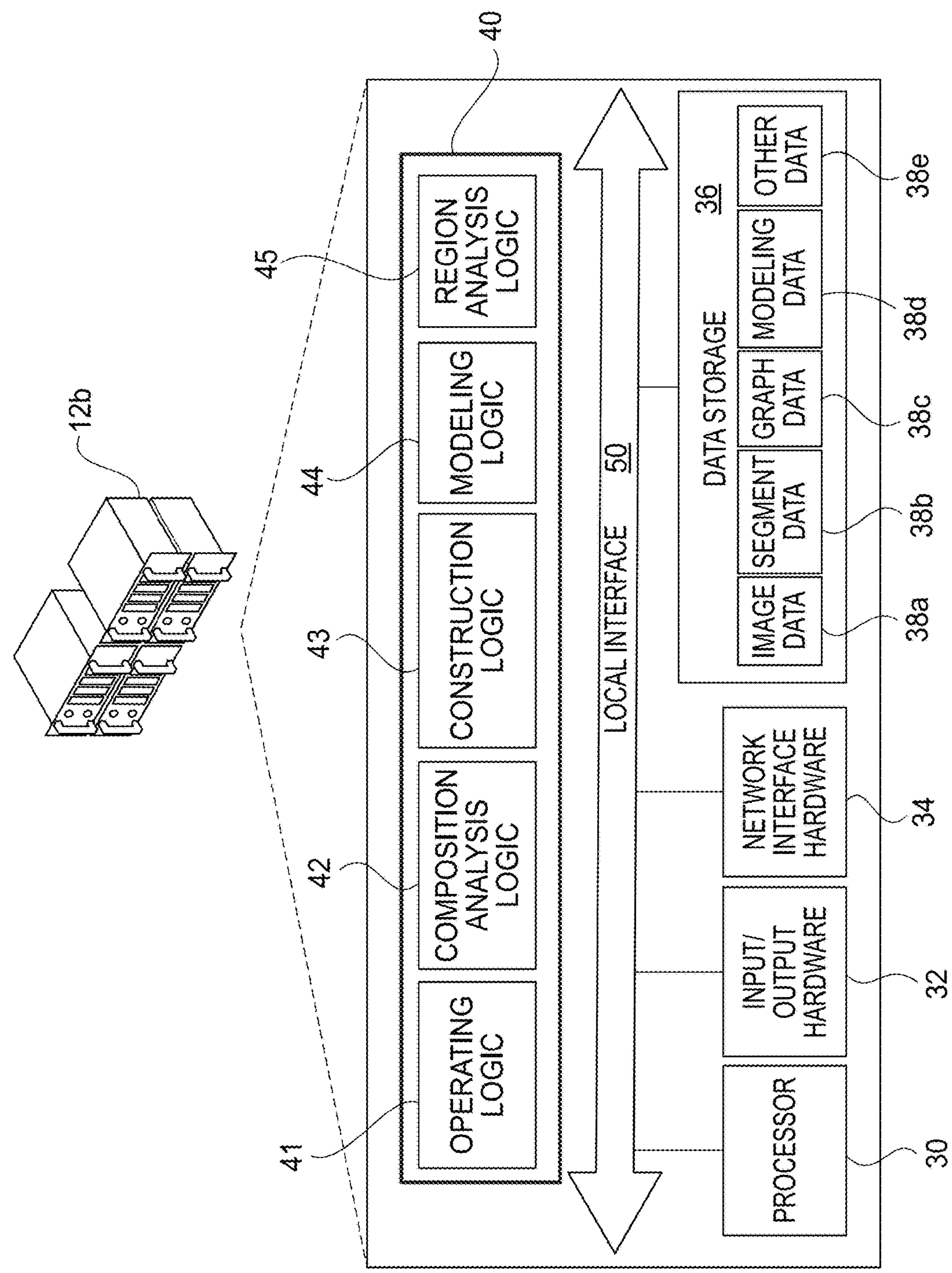
FIG. 2 schematically depicts the server computing device from FIG. 1, further illustrating hardware and software that may be used in electronically assessing a visual significance of pixels or regions in an electronic image according to one or more embodiments shown and described herein.

FIG. 2 depicts the server computing device 12*b*, from FIG. 1, further illustrating a system for electronically assessing a visual significance of pixels or regions in an electronic image. While the components depicted in FIG. 2 are described with respect to the server computing device 12*b*, it should be understood that similar components may also be used for the user computing device 12*a* and/or the administrator computing device 12*c* (FIG. 1) without departing from the scope of the present disclosure.

The server computing device 12*b* may include a non-transitory computer-readable medium for searching and providing data embodied as hardware, software, and/or firmware, according to embodiments shown and described herein. While in some embodiments the server computing device 12*b* may be configured as a general purpose computer with the requisite hardware, software, and/or firmware, in other embodiments, the server computing device 12*b* may also be configured as a special purpose computer designed specifically for performing the functionality described herein. In embodiments where the server computing device 12*b* is a general purpose computer, the methods described herein generally provide a means of improving a technology that resides wholly within the realm of computers and the internet (i.e., improving a computer's ability to analyze electronic images).

As also illustrated in FIG. 2, the server computing device 12*b* may include a processor 30, input/output hardware 32, network interface hardware 34, a data storage component 36 (which may store image data 38*a*, segment data 38*b*, graph data 38*c*, modeling data 38*d*, and other data 38*e*), and a non-transitory memory component 40. The memory component 40 may be configured as a volatile and/or a nonvolatile computer-readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store various processing logic, such as, for example, operating logic 41, composition analysis logic 42, construction logic 43, modeling logic 44, and/or region analysis logic 45 (each of which may be embodied as a computer program, firmware, or hardware, as an example). A local interface 50 is also included in FIG. 2 and may be implemented as a bus or other interface to facilitate communication among the components of the server computing device 12*b*.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data (e.g., a device that allows for direct or indirect user interaction with the server computing device 12*b*). The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12*b* and may be configured to store one or more pieces of data and selectively provide access to the one or more pieces of data. As illustrated in FIG. 2, the data storage component 36 may store image data 38*a*, segment data 38*b*, graph data 38*c*, modeling data 38*d*, and/or other data 38*e*, as described in greater detail herein.

Included in the memory component 40 are the operating logic 41, the composition logic 42, the construction logic 43, the modeling logic 44, and/or the region analysis logic 45. The operating logic 41 may include an operating system and/or other software for managing components of the server computing device 12*b*. The composition analysis logic 42 may include instructions for performing a composition analysis on an electronic image to partition the image into segments, parts, and/or the like, as described in greater detail herein. The construction logic 43 may construct various analysis components, such as an attributed composition graph, a composition significance map, an integrated differential composition significance map, and/or the like as described in greater detail herein. The modeling logic 44 may be used to construct various models, such as a visual significance model that is based on an attributed composition graph. The region analysis logic 45 may analyze and determine one or more regions within an electronic image, as described in greater detail herein.

It should be understood that the components illustrated in FIG. 2 are merely illustrative and are not intended to limit the scope of this disclosure. More specifically, while the components in FIG. 2 are illustrated as residing within the server computing device 12*b*, this is a nonlimiting example. In some embodiments, one or more of the components may reside external to the server computing device 12*b*. Similarly, as previously described herein, while FIG. 2 is directed to the server computing device 12*b*, other components such as the user computing device 12*a* and the administrator computing device 12*c* may include similar hardware, software, and/or firmware.

As mentioned above, the various components described with respect to FIG. 2 may be used to carry out one or more processes and/or provide functionality for electronically assessing a visual significance of pixels or regions in an electronic image. An illustrative example of such processes are described herein below.

Image Cropping/Scaling

Two major schools of approaches for image cropping are generally understood. For example, one approach is based on attention models. In another example, another approach is based on aesthetics measure. Attention-based approaches focus on finding important objects/regions from an image.

Then a cropping area attempts to cover as much as possible the important regions. The assessment of the importance does not take into account of composition. The aesthetics-based approaches compute an aesthetic score for a cropped area and choose an area with the highest score. Such approaches by setup will take into consideration composition and various aesthetics rules of composing an image. However, these methods are designed specifically for cropping/scaling and cannot provide a significance map for the image pixels. Moreover, the aesthetics-based approaches compute a score for a cropped area that only depends on the appearance of the cropped area. Although composition is considered, only the composition of the cropped area matters. If an area is well composed by itself, it will be favored during cropping, even if it is not seen as significant with respect to the original composition. For instance, consider an image with a logo stamped on it. A cropped area of the logo may be judged as well composed assuming the logo is well designed. Moreover, assessing aesthetics of an image is itself a very difficult problem. Therefore, for many images, cropped results generated by maximizing aesthetics scores are not particularly pleasing.

Composition may be taken as a major consideration when cropping images by other methods. Similarly as the aesthetics-based approaches, these two methods aim particularly at image cropping and do not provide a significance map for the image. New features are defined to capture composition information, e.g., spatial arrangement of objects. The fundamental rationale of the works is to compare the composition features of either a cropped area or a segmented region with the counterparts extracted from a set of training images with expert manual cropping. For example, the manually cropped areas in the training images are assumed to be desirable examples and a close match of a candidate cropping to any example indicates high preference for this candidate. In another example, training images are used to evaluate the effectiveness of features for predicting whether a region should be cropped or cut-through. Although compositional features are used, they are individual features computed for a pixel or a segment. Neither example characterizes the overall composition of the image by a graph. Moreover, neither example characterizes the relationships among segments in terms of their spatial arrangement in the image plane. Hence although spatial information is used in their features, there is no attempt to quantify the spatial interactions among elements in the image. In addition, neither example assesses directly and stores as features how prominent a segment appears with respect to its neighboring segments or with respect to the whole image.

Figure 3:
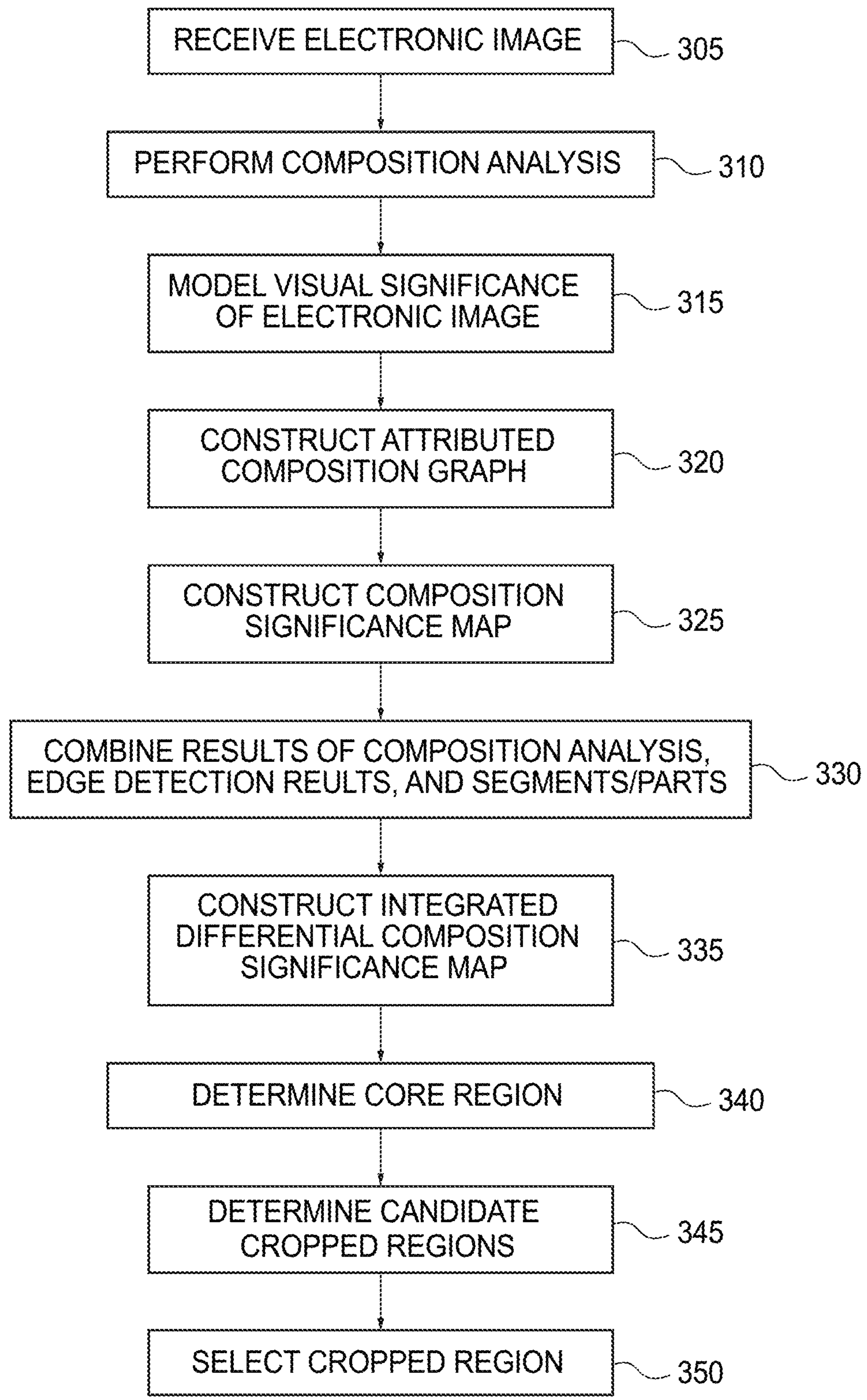
FIG. 3 depicts a flow diagram of an illustrative method of electronically assessing a visual significance of pixels or regions in an electronic image according to one or more embodiments shown or described herein.

As such, the present disclosure provides a method for assessing the visual significance of segmented regions in an image. Referring to FIG. 3, the electronic image is received at step 305 and a composition analysis on the electronic image is completed at step 310. The composition analysis includes partitioning the image into segments. The segmentation method is not limited by the present disclosure, and may generally be any segmentation method now known or later developed used to divide an electronic image into regions. The segmentation method may be tuned to ignore details. Although some recent saliency detection methods also use segmentation, their segmentation step is to generate super-pixels, instead of a much smaller number of segments. As a result, existing saliency detection methods are found quite slow, taking close to one minute to several minutes for an image of size 400×300. In contrast, the present method takes on average less than 50 milliseconds to process an image of similar size (the entire process including segmentation, composition analysis, computing visual significance, and optimizing cropping), faster by more than a thousand times. As a result, the present method significantly improves computing speed in processing electronic images.

In order to assess the compositional significance of a segment in an image, the amount of time that an eye will stay on a particular segment is modeled at step 315. When the eye drifts outside of the image, the viewing of the whole image is over. The segment which retains the eye the longest is considered to have the highest significance. In some embodiments, a statistical model called a Markov chain may be utilized to simulate the process. It should be understood that a Markov chain is a type of stochastic process that has either discrete time index or continuous time index. A Markov chain is a stochastic process that satisfies the conditional independence of the future observations from the past observations given the present. Let X(t) be a stochastic process. For a Markov chain, the conditional distribution $P(X(t)|X(t'), t'<=t\mathbf{0})=P(X(t)|X(t\mathbf{0}))$. The set of possible values for X(t) is called the state space of the Markov chain. A particular value is called a state. The Markov chain may be a discrete Markov chain or a continuous Markov chain. That is, if the time index t takes integer values, the Markov chain is called discrete-time or discrete. If the time index t is the continuous real number, then the Markov chain is called continuous-time or continuous. The amount of time or proportion of time which a state in the Markov chain occurs indicates a visual significance of the state. If any realization X(t) of the Markov chain is viewed (e.g., a sample instance of the whole chain), the number of times X(t) takes a particular value can be computed. This may be referred to as the number of times that value or state occurs. If the Markov chain is irreducible and ergodic, every state will occur infinitely many times but their respective frequencies of occurring will converge to the stationary distribution. These frequencies may be referred to as the proportion of time a state in the Markov chain occurs and can be used to indicate the visual significance. If the Markov chain contains transient states, the expected number of times a transient state occurs is finite. This finite number can be used to indicate the visual significance of a transient state.

In some embodiments, the Markov chain contains a state that represents outside the image. For example, a Markov chain's state space contains the index set of the segments of the image. In addition, the state space contains an index assigned to "outside the image". When the Markov chain is in a particular state, it means the eye is currently looking at the segment corresponding to that state. When the eye moves outside the image, the Markov chain takes the value of the state corresponding to "outside the image".

An attributed composition graph is constructed for the image at step 320. More specifically, each node of the graph corresponds to a segment of the image or an area outside the image, as described hereinabove. Each node of the graph corresponds to a state in the Markov chain. The visual significance of the state in the Markov chain is assigned to the corresponding segment as a significance score of the segment. A significance score for each segment may be used to construct a composition significance map of the image at step 325. Because each segment contains a set of pixels in the image, the significance score of the segment is assigned to every pixel it contains. This way, every pixel in the image is given a significance score. Significance scores residing on all the pixel locations in the image may be referred to as the composition significance map.

The segmented regions (or in short segments) are taken as masses. However, masses are not only the visual elements that play a role, lines also affect the visual significance assessment. The boundaries of segments are in fact crucial line elements in an image; and in addition edges are major visual cues during the segmentation process. Consequently, although the present visual significance assessment is imposed on segments, how the result is used depends critically on whether a pixel locates on the boundaries or interior of segments. In addition, as will be explained later, scenarios are also detected when edges will likely be more reliable visual elements, under which case edges will be used more directly.

Spatial arrangement of the segments plays a major role in determining significance. For instance, consider a line drawing image that is essentially binary, black for the lines and white otherwise. Suppose the image is segmented based on the lines and the segmented regions within the lines are identically white. In such a scenario, where conventional saliency detection fails to yield meaningful result given the fact there is no contrast between the segments, the method in the present disclosure can still assess the significance of the segments based purely on spatial arrangement. The present disclosure explicitly models the spatial connectivity of the segments and how the segments interact spatially, without assuming simply the geometric center of the image plane is more important.

The nodes that represent segments are connected when they are spatially adjacent. The purpose of building such a graph is to capture the spatial arrangement characteristics.

Each node of the attributed compositional graph contains three types of attributes, including individual attributes, pairwise attributes, and/or attributes with respect to the image as a whole. The individual attributes include visual features that reflect visual characteristics of the individual segments, and the pairwise attributes include relationships between a segment and its neighboring segments.

Because the present disclosure model is built on the notion of composition rather than the notion of being distinct in saliency detection, the graph that is constructed is not symmetric. The weight assigned to each edge in the graph is not a measure of how similar the two nodes are, but how likely the eye will traverse from one node to another. The edge weight from node i to j is in general different from that from node j to i, and depends on visual preference defined from composition perspective. In addition, the weight depends not only on the pair of nodes, but also on information yielded from the global composition analysis.

In some embodiments, a continuous-time Markov chain that is not ergodic and not irreducible may be employed. A fundamental assumption may be that the eye will only be retained in the image for a finite amount of time. In the graph constructed according to the present disclosure, there is a node representing "outside the image." This special node is the only recurrent state of the Markov chain (MC) while all the other nodes representing segments inside the image are transient. Interestingly, according to the model of the present disclosure, the shape of the image frame, e.g., rectangle, sphere, oval, half circle, or the like, will affect the assessment of visual significance for segments inside the image.

Because the visual significance assessment is built upon segmentation, the present disclosure provides a validity assessment of the segmentation results. For the purpose of the validity assessment, the composition analysis may further be performed. The composition analysis further includes texture analysis. The image is classified into a textured image versus a non-textured image. The textured images are further classified into strongly textured versus moderately textured. If an image is strongly textured, it is highly unlikely the image depicts objects. That is, the image is mostly likely a patch of pattern or texture. An image is "moderately textured" if the pixels are clustered into groups and all of the groups except one are scattered evenly across the whole image while a single group is more clumped. This indicates that there is probably some interesting portion of the image that stands out from the rest. If an image is moderately textured and the number of segments obtained by the segmentation algorithm is not greater than the number of groups, the single special cluster of pixels are prone to be wiped out during the segmentation. The cluster of pixels may be referred to as a weak signal.

The Sobel edge map may be designated a threshold and the percentage of pixels with edge values above a pre-given threshold may be computed. If the percentage is below a particular threshold, it indicates that the edge pixels are scarce. If the edge pixels are scarce and the number of segments generated is small, the geometry of the segments may be examined. If the geometry of the segments does not indicate a single object centered composition, it is likely that the segmentation has produced too few segments and the edges found by edge detection will tend to play more important roles in the visual impression of the image. As a result, edge map information is recommended to add upon the significance map based on segmentation.

The method of the present disclosure can combine results of composition analysis, edge detection, and segmentation results at step 330. The classification into moderately textured, strongly textured, and non-textured, as described herein, is part of the composition analysis. For textured images, the segmentation of the images which aims at treating non-textured images is considered to have low robustness. As a result, the composition visual significance map is used differently from how it is used for non-textured images. In addition, as described hereinabove, by analyzing the edge map and the segmentation result, under certain conditions, the edge map is given more importance than usual in applications. This may be completed to estimate the robustness of the segmentation result. According to the assessment, different ways of using the compositional visual significance map may be used in an application.

By detecting the significant and aesthetic regions in the photos, a number of photo-related software applications and the systems running such software applications can be improved, especially when the screen size is small, e.g., phones, watches, or pads. As a result, a significant improvement can be made to display on such devices. For example, by cropping/scaling an image, the part of image which carries the most information of an image can be displayed on a small display area. The cropping/scaling of images also saves disk spaces so that more information can be stored on a limited space.

For cropping/scaling an image, a "core" region which covers the most significant region is determined at step 340. In some embodiments, the core region includes faces or the segment with highest significance score. If the segment with the highest significance is larger than the allowed crop window size, part of the segment is chosen to be included in the core region based on spatial arrangement of the segment.

A plurality of candidate cropped regions are determined at step 345 where each of the candidates includes the core region and is assigned a merit score. The merit score may be a sum of an integrated differential significance score of each pixel in the region.

The integrated differential significance score of each pixel is same as the significance score of each pixel if the pixel is a boundary pixel between two segments. If a pixel is not a boundary pixel, that is, the pixel is in the interior of a segment and is not adjacent to any pixel belonging to a different segment, the integrated differential significance score for this pixel is set to zero. The significance score for each pixel is the significance score of the segment to which the pixel belongs. However, when the validity assessment yielded from composition analysis, as described hereinabove, indicates high susceptibility of the composition significance model to errors, different values are assigned as the integrated differential significance score of pixels based on composition significance map, edge detection and texture analysis results.

At step 350, the cropped region having the highest merit score may be selected to use as the "nearly final" cropped image for the image. A series of small adjustments that shift the "nearly final" cropped region within a range much smaller than the crop window size is made to achieve the aesthetically further improved final cropped image.

Figure 4:
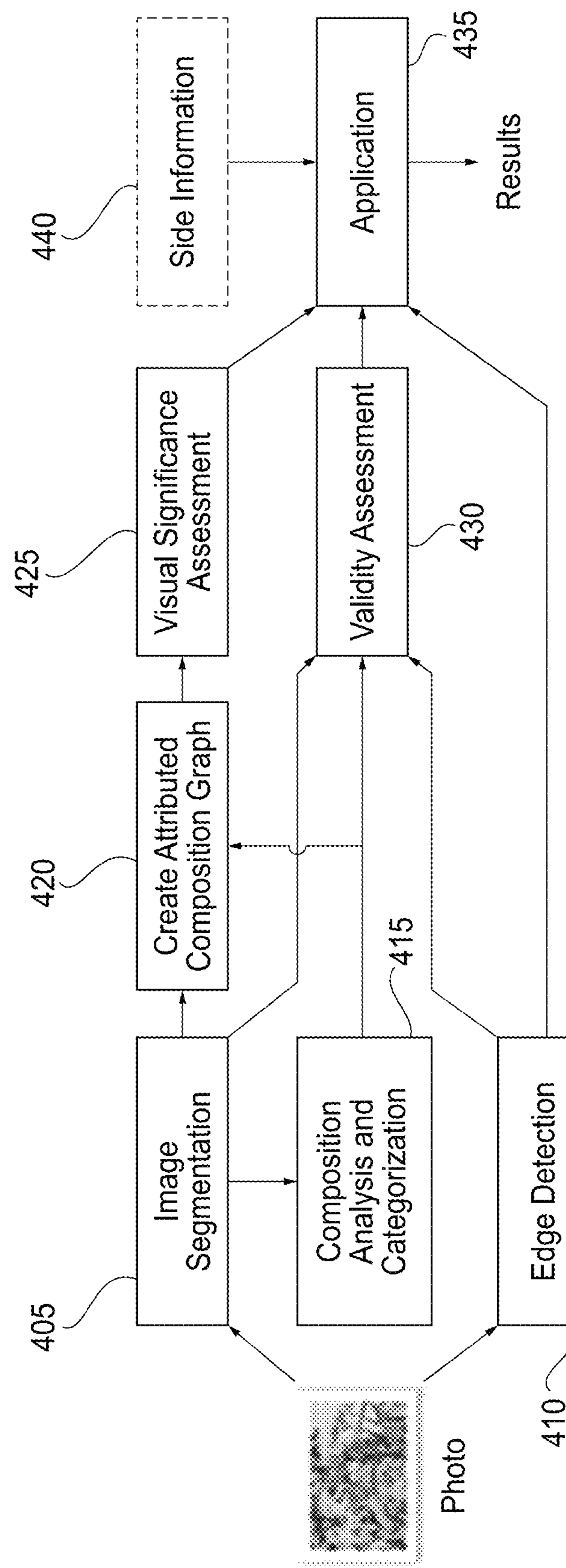
FIG. 4 schematically depicts an illustrative system architecture according to one or more embodiments shown and described herein.

The architecture for establishing the Compositional Significance and Attractiveness model and applying it is shown in FIG. 4. The image is segmented at step 405. Segmentation may include, for example, applying a MS-A3C segmentation algorithm to the input images. The Multi-Stage Agglomerative Connectivity Constrained Clustering (MS-A3C) image segmentation algorithm is an image segmentation algorithm that combines the strengths of k-means and A3C clustering to achieve high speed, as well as high accuracy. This segmentation algorithm takes into account color variation, edges, and image-wide global characteristics. The number of segments in an image may range from about two segments to about two dozen segments, where the number of segments may be dependent on the complexity of the image. Edge detection is also performed at step 410, and the edge map is stored for possible future use. A global composition analysis and categorization is carried out based on the segmentation result and clustering of pixel color values at step 415. The global composition analysis result and the image segmentation result are combined to construct the attributed composition graph (ACG) at step 420. Each segment corresponds to one node of the graph. The connectivity between the nodes is determined by the spatial adjacency of the segments. Moreover, a rich set of attributes are created on this graph, attempting to capture the individual visual characteristics of the segments as well as their compositional relationships with other segments and the overall image. The pairwise relationship between two connected segments may be symmetric or asymmetric.

The compositional significance and attractiveness (CSA) model is then developed to assess the significance of the segments at step 425. The drift of the eye is modeled over the segments by a Markov chain (MC). An additional node corresponding to "outside the image" is added to the graph and is connected with all the segments bordering the outer frame of the image. Different from the typical usage of discrete-time Markov chains in computer vision, where the MC is assumed stationary and its equilibrium distribution is sought after, a continuous-time Markov chain is used that is not irreducible and hence has no stationary distribution. In fact, every segment as a state of the MC is a transient state and only the state corresponding to "outside the image" is a recurrent absorbing state. The average amount of time the MC will spend in any transient state given that the chain starts in another transient state (that is, from inside the image) is computed. A longer average time means the eye will be retained in this segment longer, indicating a higher visual significance. Because the average time the MC will be in any segment is measured rather than the probability of visiting this segment, the comparison can be valid even for comparing different images.

Image Segmentation and Global Composition Analysis

A global composition analysis and categorization may be carried out using any method now known or later developed. One illustrative method is discussed in U.S. patent application Ser. No. 14/705,252, which is incorporated herein by reference. The global composition analysis means mostly the composition categorization. Based on the categorization, features can be defined that explicitly indicate the role of a segment in composition, for instance, dominant background, interior, diagonal, enclosing another segment, being enclosed by another segment.

The composition categorization is performed based on the segmentation result. The categorization classifies whether an image is of a centered composition, where the image has a center object against a background, which can be either relatively uniform or with certain amount of variation. If a centered composition is declared, the method identifies which segment or segments are the background and which segments are the foreground. The categorization detects whether certain segment has a strong diagonal appearance with respect to the image frame. The categorization detects whether an image looks like a relatively homogenous patch of texture, or whether there is some segment that seems to be a weak signal, i.e., something standing out.

Attributed Composition Graph

Figure 5:
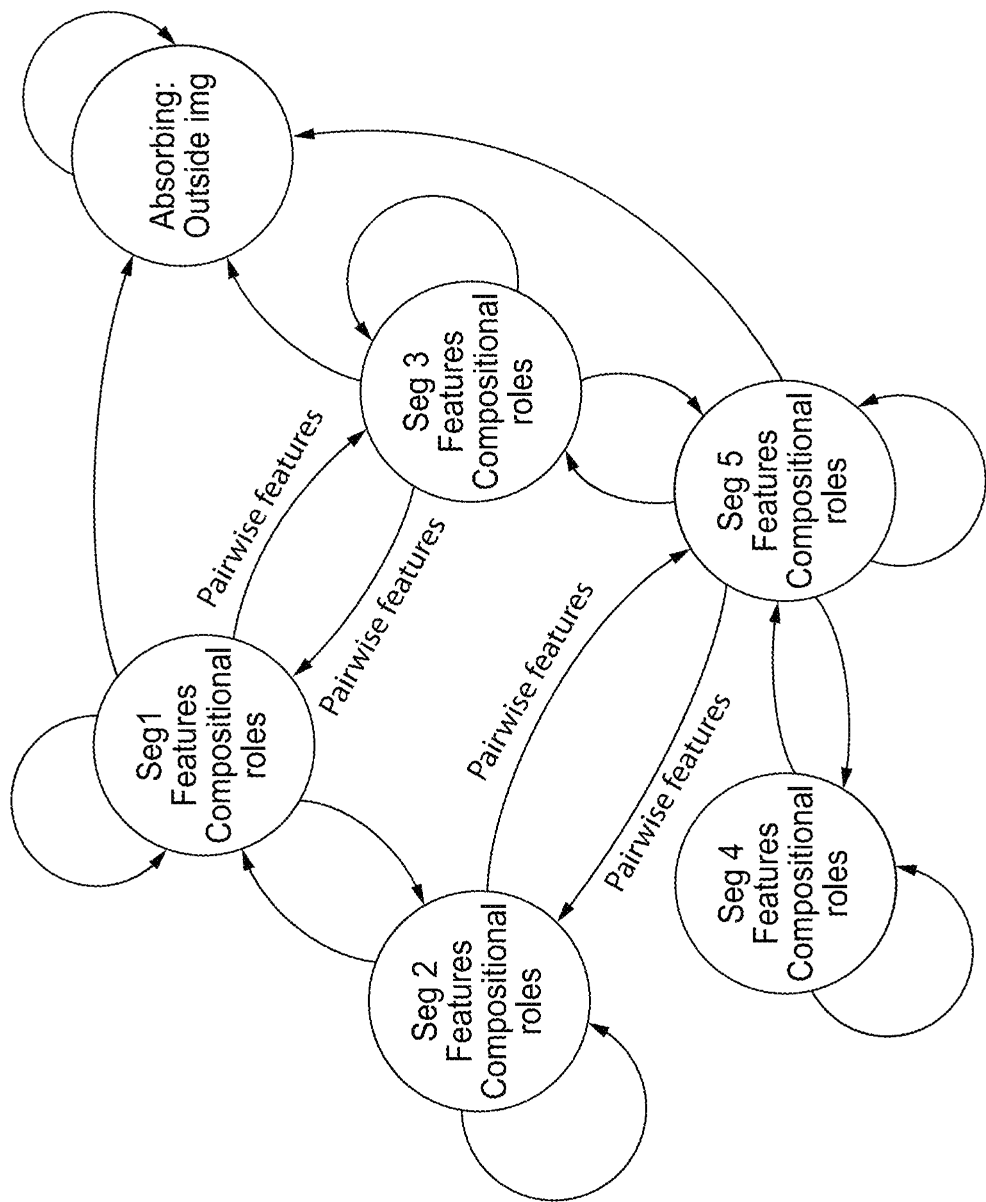
FIG. 5 schematically depicts an illustrative attributed composition graph according to one or more embodiments shown and described herein.

First, a graph is constructed with each node corresponding to a segment. Two nodes are connected if the segments are adjacent spatially in the image plane. That is, one segment is at the boundary of another and vice versa. This graph is called an Attributed Composition Graph (ACG), an example of which is illustrated in FIG. 5. Three types of attributes are generated for each node.

1. Visual features that reflect the segment's individual characteristics. Some of the features are computed using only information about the pixels in this segment, while others also depend on the overall composition analysis of the whole image. In particular, the following features are recorded for each segment.
   (a) Average color values in both LUV and HSI spaces.
   (b) The average distance of a pixel in the segment to the compositional center of the image. Here, the compositional center is not the usual geometric center of the image. It is commonly accepted that the center with respect to composition is not necessarily the geometric center of the image frame. For example, the segment that has the shortest average distance to the other segments is found. The geometric center of that segment is defined as the compositional center of the image. This is a quick solution, although one can use more elaborated definitions.
   (c) A measure of divergence or richness of content in the segment. Instead of using some common measure such as variance of the color, the result of the hierarchical segmentation procedure discussed with respect to the MS-A3C segmentation algorithm is exploited so that the measure of richness is more robust against uninteresting variation of pixel colors.
   (d) The aspect ratios of the bounding boxes of the segment. The bounding box is formed in both the usual way, that is, a flat rectangle, and a diagonal way, that is, a rectangle rotated to align with the diagonal of the image frame. This is motivated by the importance of diagonal elements in the image.

(e) The role of the segment for composition, for instance, whether the segment is background if the image is classified as a "centered" composition, whether the segment is diagonally prominent, and whether the segment encloses another segment or being enclosed by another. Diagonal refers to how well the segment aligns with either diagonal direction of the image frame.

2. Visual features that reflect the pairwise relationship between the segment and each of its neighbor. Because this is a pairwise feature, these features are associated with every existing edge connecting two nodes. If these are called "edge features", they are directional, which means for an edge between node $v_i$ and $v_j$, two sets of features exist-one set indicating how $v_i$ compares to $v_j$ and the other indicating how $v_j$ compares to $v_i$.

Specifically, in the respective terms of color, the extent of being central in the composition sense, and richness of the content, a probability-kind of value is computed to quantify the extent that one segment attracts the eye more than the other. As a result, these quantities are not symmetric in i and j. A value to quantify the dissimilarity in orientation, which is symmetric with respect to i and j, is also included as a feature. Consider color features first. For the link from segment i to segment j, a quantity for the extent of segment j's color attracting the eye more than i's. may be computed. This may be formulated as a classification problem. Specifically, given a pair of color vectors, find the probability that the first color is more attractive than the second.

It is nontrivial to decide which color is more preferable. There is no simple rule. For instance, although some often assume more saturated colors attract the eye, the assumption is approximately right when the colors are of similar brightness. What if the colors are quite different in brightness or what if the colors have similar saturation but different hues? An experiment was designed to solicit subject's opinions on which colors are more preferable than others. One thousand pairs of colors sampled from the color space are compared, and the subject responds by choosing a color that appears to stand out more than the other. Artificial images containing two colors were generated: a sphere with one color in the middle of a square-shaped image and a surrounding area with the other color. For each pair of colors, two such images with the roles of the colors reversed were created—each color assigned to the sphere once in one image. The subject looked at both images simultaneously and chose an image for which the center sphere seemed to pop out and keep the attention of the eye, while the surrounding area did not seem to distract the eye. The reason for using two images with the colors reversed is to give the subject a comparison so she can see which image has a center sphere that attracts the eye more. The color for that sphere is then taken as the more attractive one between the two. This is of course a rather simplified treatment of color comparison. In fact, even the idea of pairwise interplay between colors is a simplified view of a complicated issue because how one responds to color depends much on the context because colors interact with each other in a highly multi-party way. However, for tractability, simplified approaches may be used. The approach that is used is data-driven based on a carefully crafted visual experiment with human input on a rather large number of samples.

Based on the results of this visual experiment, a logistic regression model is then trained on the pairs of colors and some of their nonlinear transforms to estimate the probability that one color is favored over the other. This logistic regression function is then used as the desired probability in the present system described herein.

In addition to color, for the link from segment i to j, a probability-kind of value is computed to assess the extent that j is more favored than i in terms of being more central, having richer content, and being different in orientation. For centrality and richness, these quantities are not symmetric in i and j, while for orientation, the quantity is symmetric. As described in the individual features, features to measure centrality, richness, and orientation exist. Given the pair of measurements for j and i, a similarity score is computed. Let the computed similarity score be z. Then a sigmoid function is exploited to convert the similarity score to a value in [0, 1]. Being more central and having richer content are assumed to be favored by the eye, while for orientation, simply the difference is favored. If j is more favored than i, the sigmoid function used is the logit function $$f(z) = \frac{e^{a_0+a_1z+a_2z^2}}{1+e^{a_0+a_1z+a_2z^2}}.$$

When it comes to compute the similarity score between a pair quantities, a function is used which may be referred to as the "wing" function because its 3-D graph looks like a pair of wings pointing upwards. Use of subtraction or ratio is avoided because of boundary issues for values near zero or exaggerated difference when both values are large as well as a lack of symmetry in some aspect. Take the orientation as an example. Suppose the orientation is characterized by an angle between 0 and $\pi/2$. A symmetry around $\pi/4$ by the nature of angles may be desired. This wing function may ensure such symmetry. It also ensures that when either of the pair of values goes to zero or infinity, the function is finite. Let a be the reflecting point and c a scaling constant. The wing function for characterizing the dissimilarity between x and y is $$f_w(x, y) = \begin{cases} \frac{c(x, y)^2}{x^2 + y^2} & x > a,\ y > a \\ \frac{c(x, y)^2}{(2a - x)^2 + y^2} & x \le a,\ y > a \\ \frac{c(x, y)^2}{x^2 + (2a - y)^2} & x > a,\ y \le a \\ \frac{c(x, y)^2}{(2a - x)^2 + (2a - y)^2} & x \le a,\ y \le a \end{cases}.$$

A check on the derivatives of fw(x, y) shows that when either x or y is fixed, fw(x, y) increases when the other variable moves farther away from it.

3. Visual features that characterize global traits of a segment with respect to the whole image, for instance, how standing out is the color of the segment with respect to the whole image? Does the segment play a special role in the composition of the whole image, e.g., being diagonal with respect to the image frame?

After the attributes for each node and each pair of connected nodes are computed, the weight is defined for edge between (i, j), denoted by $e_{i,j}$. The value $e_{i,j}$ depends mostly on the pairwise attributes between (i, j) as well as the role of the segments in the overall composition of the image. For instance, if an image is classified as the "centered" composition category, the way $e_{i,j}$ is set up is quite different from the other types of images. A parameter $\mu_i$ is set according to the attributed graph established. As will be explained in detail in the next section, the parameter $\mu_i$ will be used in the compositional significance and attractiveness model. The parameter $\mu_i$ for each node i depends on composition factors such as background and diagonal as well as how distinct the segment stands out with respect to the whole image and sometimes with respect to more local surroundings.

Compositional Significance and Attractiveness Model

In order to assess the compositional significance of a segment in an image, the amount of time that the eye will stay on this segment is modeled. Composition plays a key role in determining how long a picture can hold the attention of the eye.

Eye movement may be modeled by a continuous time Markov chain. Each segment in the image corresponds to one state of the MC and "outside the image" is also a state. A continuous MC is a discrete-time MC embedded in continuous time where the amount of waiting time for a state transition to happen follows the exponential distribution with the parameter determined only by the current state. The discrete-time MC is called aptly the jump chain. The spatial arrangement of the segments is dominant in setting up the jump chain, while the characteristics of the individual segments determines mainly the distribution of the waiting time for a state transition.

As elaborated in the previous section, in the present system described herein, an image is represented by an attributed graph. A node of the graph corresponds to a segment. Denote the graph by G=(V,E). The collection of nodes in the graph $V=\{v_0, v_1, \ldots, v_k\}$, where $v_0$ is "outside the image" and $v_i$, i=1, . . . , k corresponds to the k segments of the image. An edge between node i and j exists if segment $v_i$ and $v_j$ are spatially adjacent in the image plane (also called neighbors). The "outside" node $v_0$ is the single absorbing state in the MC, that is, the transition probability from this state to itself is always 1. In order to set up the MC, attributes for each node are computed. The attributes come from three types: individual attributes, pairwise attributes, and attributes with respect to the whole image. Based on those attributes as well as the global composition analysis result, a weight $e_{i,j}$ is assigned to the edge from i to j. In general, $e_{i,j}$ is not equal to $e_{j,i}$. If no edge exists between i and j, $e_{i,j}=e_{j,i}=0$. For the jump chain $P_{i,i}=0$ for $\forall_i$ that is not equal to 0. For any segment that border the outer frame of the image, $P_{i,0}>0$, otherwise $P_{i,0}=0$. Between the segments, $P_{i,j}>0$ if segment i and j are neighbors, and $P_{i,j} \propto e_{i,j}$.

In some embodiments, the jump chain is not irreducible. In fact, only the "outside" node $v_0$ is a recurrent state and all the other states are transient. This means the MC eventually will enter state $v_0$ and at that point, the viewing of the image is over. Starting from any initial state inside the image, the average amount of visits the MC will pay to each node can be computed. Let $P_T$ be the submatrix of P that contain the transition probabilities between the transient states. Let matrix $S=(s_{i,j})$ where $s_{i,j}$ is the expected number of visits that the jump MC will spend in state j given that it starts in state i. Let I be the identity matrix. Then $$S=(I-P_T)^{-1} \tag{1}$$

If it is assumed that the prior is uniform over the transient states for the initial state of the jump chain, the expected number of visits the jump chain spends in any state is $s=(s_1, s_2, \ldots, s_k)^t$. And $$s = \frac{S^t 1}{k} \tag{2}$$

For a continuous time MC, the amount of time the MC spends in a state also depends on the waiting time for a transition to occur at any state. The waiting time follows an exponential distribution with rate $\mu_i$ which depends on the state i. The expected value of the exponential distribution is $1/\mu_i$. The u, is set according to the attributed graph established. Finally, the amount of time spent in state i is $s_i/\mu_i$, which is defined as the compositional visual significance (or in short compositional significance) for state i.

Under the continuous-time MC, the amount of time spent in state i naturally factors into two parts: the average number of visits to the state based on the jump chain determined by the spatial arrangement incorporated with other usual visual characteristics, and the waiting time for a transition to happen determined mostly by the color and shape characteristics. The waiting time may be, for example, the static part without consideration of the drifting of visual focus, and the jump chain as the dynamic part. The waiting time can be modeled by any conventional significance or saliency map generated by other algorithms. By combining the jump chain with the waiting time to form a continuous MC, spatial composition information can be integrated with other existing analysis that does not address composition, for instance, a saliency map.

Validity Assessment Via Composition Analysis

Because the visual significance assessment is built upon segmentation, while image segmentation is itself a very challenging task with performance strongly affected by the type of images analyzed, a module in the system that assesses the validity of the segmentation results has been developed. As illustrated in FIG. 4, composition analysis is performed on the image and the results of composition categorization are combined with edge detection and segmentation results to gauge the susceptibility of the segmentation result at step 430. If there is sufficient evidence to suspect the validity of the segmentation result, different strategies will be adopted when it comes to application at step 435. The significance result based on segmentation will still be used most of the time even when the suspect is high, but it will be combined with other information to increase robustness.

In the current system, the following procedure has been developed to assess the validity according to step 430.

1. Classify whether the image is a textured image versus a non-textured image. The textured images are further classified into strongly textured versus moderately textured.
2. An image is "moderately textured" if when the pixels are clustered into groups, all the groups except one are scattered evenly across the whole image while a single group is more clumped. This indicates there is probably some interesting portion of the image that stands out from the rest.

3. The Sobel edge map is established as a threshold and the percentage of pixels with edge values above a certain threshold are computed. If the percentage is below a threshold, it indicates that the image is scarce of edges. As a result, the edges found by edge detection will tend to play more important roles in the visual impression of the image. The edge detection result is thus combined with the segmentation based significance assessment.

Different strategies of applying the composition significance values are recommended under the following conditions:

1. If an image is strongly textured, it is highly unlikely the image depicts objects. The image is mostly likely a patch of pattern or texture.
2. If an image is moderately textured and the number of segments obtained by the segmentation algorithm is not greater than the number of groups, the single special cluster of pixels are prone to be wiped out during the segmentation. The special cluster of pixels may be referred to as the weak signal.
3. If the edge pixels are scarce and the number of segments generated is small, the geometry of the segments may be examined. If the geometry of the segments does not indicate a single object centered composition, it is likely that the segmentation has produced too few segments. As a result, edge map information is recommended to add upon the significance map based on segmentation.

Overview of Method of Image Cropping/Scaling

The compositional visual significance assessment model described herein may be used for cloud-based services or mobile applications. By detecting the significant and aesthetic regions in the photos, a number of photo-related applications can be improved, especially when the screen size is small, e.g., phones, watches, or pads. As a result, a significant improvement can be made to display on devices such as phones, watches or pads. The system described herein may also help visual ads companies improve their click-through rates.

Figure 6:
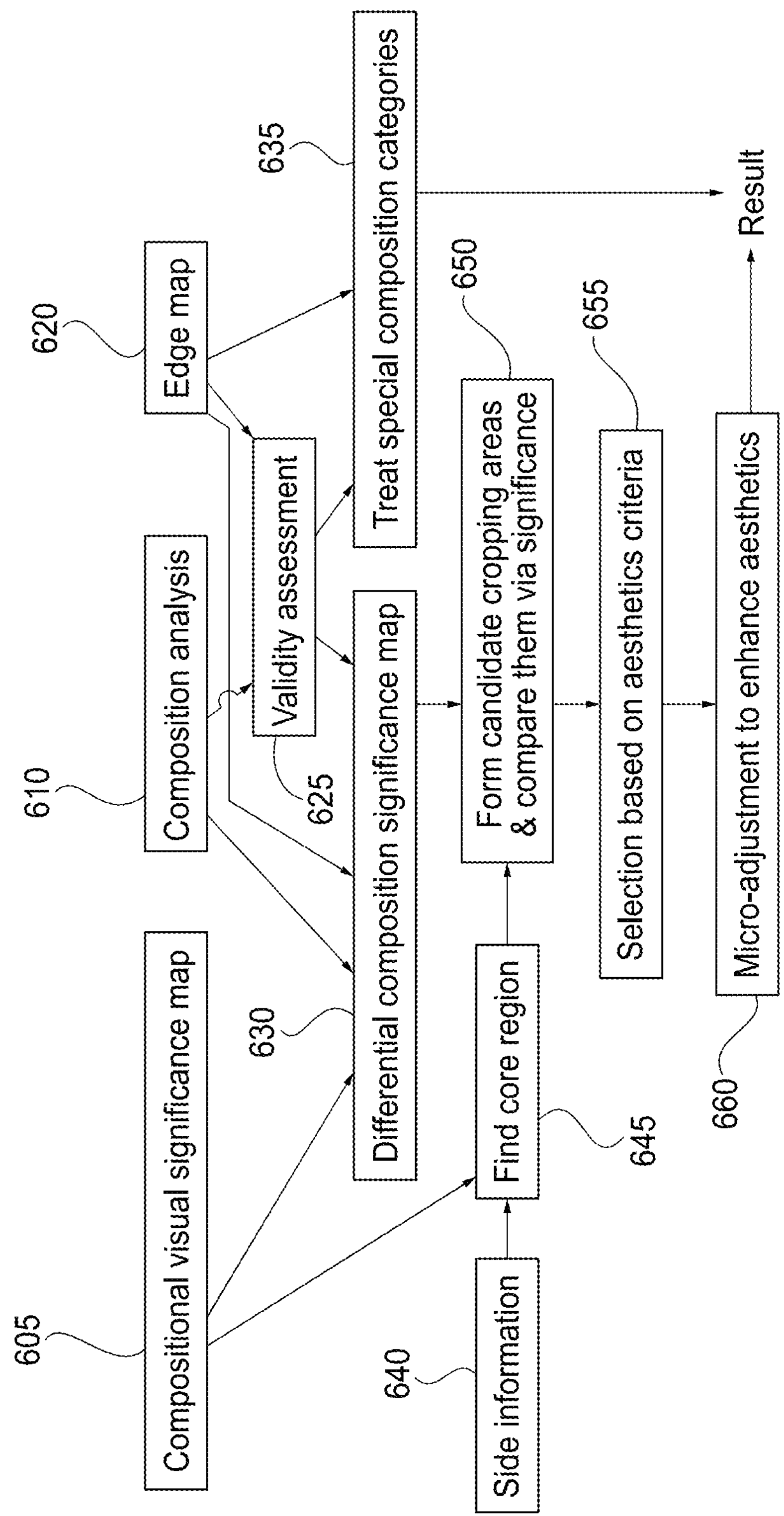
FIG. 6 depicts a flowchart of an illustrative method of cropping according to one or more embodiments shown and described herein.

As shown in FIG. 4, four sources of information are combined in the present system to generate interesting and aesthetically appealing cropped image: visual significance assessment (step 425), validity assessment (step 430), edge detection result (step 410), and side information (step 440), specifically, face detection result. The cropping algorithm includes a plurality of steps as indicated by the flowchart depicted in FIG. 6. Generally speaking, the most significant region is first covered. The smallest square covering this region is called the "core". Conditioning on covering the core, the candidate areas are ranked based on a merit score defined using the significance values given by CSA as well as measures of aesthetic appeals. At the end, several modules have been developed to achieve aesthetically pleasant placement of segments. Composition categorization plays a guiding role here. For several scenarios when the CSA model is detected to be susceptible to errors, different strategies are used in cropping.

1. At step 605, let the composition significance map be $V_{i,j}$ where $i=1, \ldots, n_r$ and $j=1, \ldots, n_c$ are indices for the pixels. $V_{i,j}$ inherits the same compositional significance of the segment to which the pixel belongs. The differential composition significance map $B_{i,j}$ is defined as follows. If pixel (i,j) is a boundary pixel between two segments, that is, in its 8-connected neighborhood, there are pixels belonging to a different segment, $B_{i,j}=V_{i,j}$; otherwise $B_{i,j}=0$.
2. According to the validity assessment (step 625) yielded from composition analysis (step 610), if high susceptibility to errors is claimed, several strategies are pursued. Let $\check{E}_{i,j}$ be the Sobel edge detection result [8]. $E_{i,j}$ be the 0/1 binary edge map of the image obtained by thresholding $\check{E}_{i,j}$. $E_{i,j}=1$ indicates existence of edge (step 620). The integrated differential composition significance map may be denoted by $\overline{B}_{i,j}$ (step 630). If high susceptibility is not claimed, $\overline{B}_{i,j}=B_{i,j}$ is set for any (i,j) (step 635).
   (a) If by composition categorization, the image is classified as strongly textured, let $\overline{B}_{i,j}=\check{E}_{i,j}\cdot E_{i,j}$.
   (b) If the image is classified as moderately textured and the segmentation result does not pass a certain test, the cropping will emphasize the weak signal (see definition in the previous section).
   (c) If the image is not classified as textured (strongly or moderately), for any pixel (i, j) with $B_{i,j}>0$, $\overline{B}_{i,j}=B_{i,j}$. If $E_{i,j}=1$, let $\overline{B}_{i,j}=V_{i,j}$. Accordingly, $\overline{B}_{i,j}$ is obtained by adding more non-zero values to pixels that are labeled as edge according to $E_{i,j}$ but are not boundary pixels of the segments.
3. Determine a core region that the cropped image has to cover (step 645).
   (d) If one or more faces are detected with side information (step 640), the core region will attempt to cover all the faces. If the allowed cropped region is larger than the biggest face detected (according to the bounding box of the face), other faces will be added in the descending order of their sizes until the allowed cropped region cannot cover more.
   (e) When there is no face detected, the core region will try to cover the entire segment with the highest significance score $V_{i,j}$. If the most significant segment is larger than the cropped area, part of it will be chosen based on spatial arrangement of the segment.
   (f) There are scenarios when no core region is claimed to be found. This may be caused by several reasons. For instance, if several segments scattered in the image are assigned with nearly highest significance scores, it is then dubious to claim a region as the core and thus the core search is aborted.
4. Given that the cropped region has to include the core region, candidate cropped regions are assigned with merit scores. Consider an area with pixels (i, j) in R. Then the merit score of R is defined as $$M(\mathcal{R})=\Sigma_{(i,j)\in\mathcal{R}}\overline{B}_{i,j}. \quad (3)$$

The rationale for defining the merit score based on $B_{i,j}$ is to favor areas including many boundary pixels from significant segments. These areas are the most interactive between the segments and are believed to be most interesting. Although this is superficially similar to cropping the images based on edges or entropy-type of measures, there are intrinsic differences. First, the choice based on the merit scores kicks in under the condition of covering a core area with highest significance, which is derived from a CSA model instead of from edges. Second, the usual edge detection result is highly prone to noise in a cluttered scene. One of two defenses against the noise may be used. Through segmentation, the edges that are important are identified. Those inside a segment are not treated as edge pixels. In addition, significance scores are assigned to the edges based on the CSA model rather than the values given by edge detection filters.

4. The candidate cropped regions are ranked according to the aforementioned merit scores (step 650). Since the boundary pixels are relatively sparse, it happens sometimes that multiple candidate areas achieve the same best merit score. Aesthetic criteria such as golden ratio division may be used to select the best region (step 655).

5. A series of micro-adjustments may be performed to achieve aesthetically appealing results (step 660).
   (a) Based on the segmentation result, it can be detected whether some segments included in the region have been slightly cut off or being very close to the boundary. The algorithm will adjust the position of the cropped area slightly, attempting to eliminate such pathological placement of segments in the area. An adjustment is accepted only if it does not cause new unpleasant placement of segments.
   (b) Composition information is also exploited to determine whether it is appealing to further shrink the cropped region. For instance, if an object is featured with respect to a much less important background, it may be preferred to crop the object more aggressively so that the object can have higher resolution or seem more prominent in the final cropped/scaled image.

Figure 7:
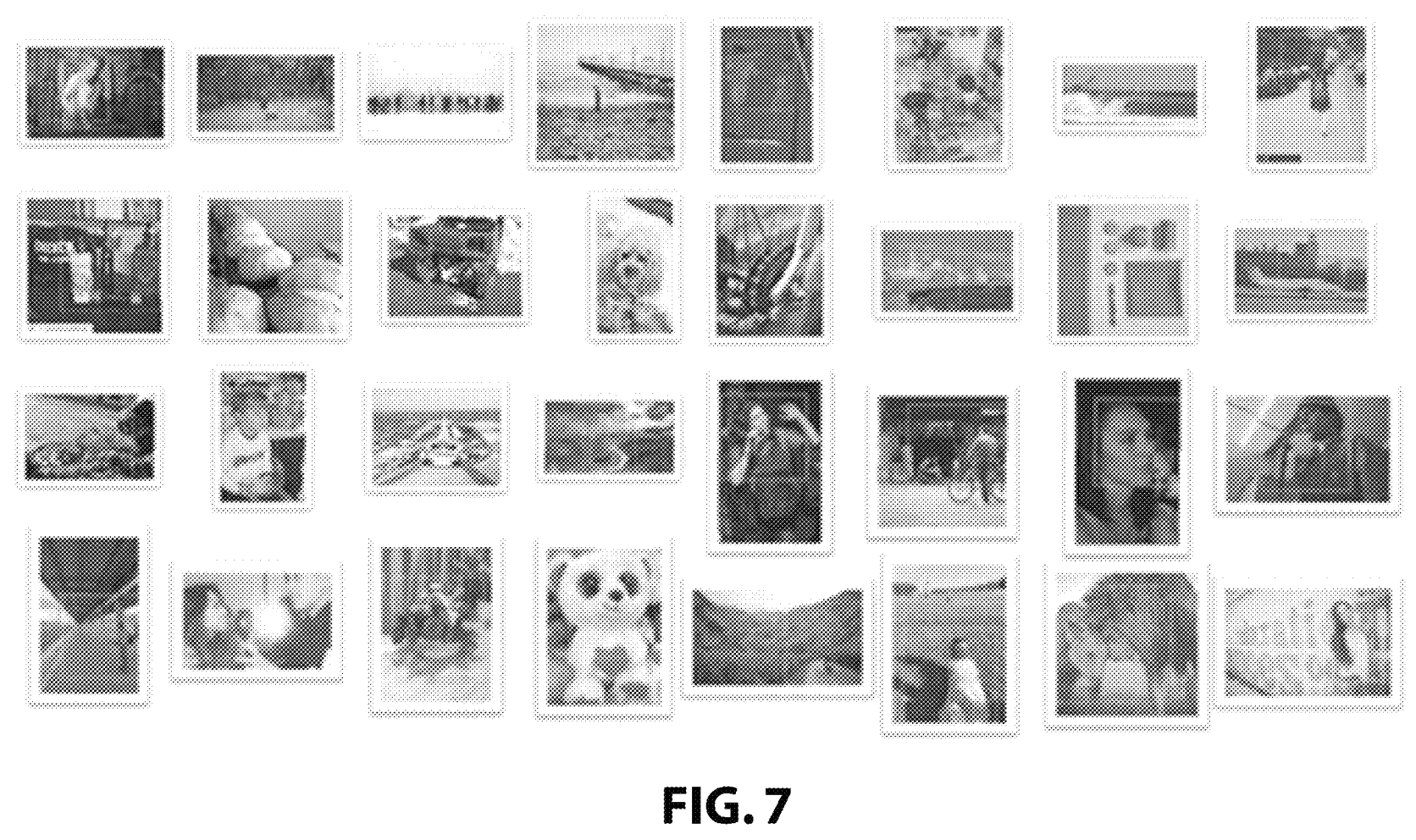

Example results are provided in FIG. 7. For all the results shown, face detection is not used. The cropping is also set to an aggressive level. The cropped area, marked out by a white square, is required to be a square and its side length is set to 75% of that of the maximums square that can fit into the image frame. Thus in terms of the area size covered, the squares shown here are about 56% of the largest squares inscribed in the image.

It will be apparent to those skilled in the art that various modifications and variations can be made to the embodiments described herein without departing from the spirit and scope of the claimed subject matter. Thus it is intended that the specifications cover the modifications and variations of the various embodiments described herein provided such modification and variations come within the scope of the appended claims and their equivalents.

The invention claimed is:

1. A method of electronically assessing a visual significance of pixels or regions in an electronic image, the method comprising:

constructing, by the processing device, an attributed composition graph comprising a plurality of nodes, wherein each node of the plurality of nodes corresponds to a segment of a plurality of segments of the electronic image or a part of a plurality of parts of the electronic image and wherein each node of the plurality of nodes comprises one or more attributes;

modeling, by the processing device, the visual significance of the electronic image based on the attributed composition graph using a statistical modeling process or a computational modeling process to obtain a plurality of values; and constructing, by the processing device, a composition significance map comprising a significance score for each segment of the plurality of segments or each part of the plurality of parts according to the values obtained from the statistical modeling process or the computational modeling process.

2. The method of claim 1, wherein the statistical modeling process utilizes a discrete Markov chain or a continuous Markov chain.

3. The method of claim 2, wherein each node of the plurality of nodes in the attributed composition graph is a state in the discrete Markov chain or the continuous Markov chain.

4. The method of claim 2, wherein:

an amount of time or proportion of time which a state in the discrete Markov chain or the continuous Markov chain occurs indicates a visual significance of the state; and the visual significance of the state is assigned to a corresponding segment of the plurality of segments or a corresponding part of the plurality of parts as the significance score.

5. The method of claim 2, wherein the Markov chain comprises a state that represents an area outside the electronic image.

6. The method of claim 1, wherein:

each one of the one or more attributes comprises an individual attribute, a pairwise attribute, or an attribute with respect to the electronic image as a whole;

the individual attribute comprises visual features that reflect visual characteristics of each segment of the plurality of segments; and the pairwise attribute comprises a relationship between a first segment of the plurality of segments and a second segment of the plurality of segments that neighbors the first segment.

7. The method of claim 1, further comprising:

performing, by the processing device, a texture analysis on the electronic image, wherein:

a texture type of the electronic image comprises a strong texture, a moderate texture, or a lack of texture, the strong texture is a patch of pattern without depicting an object, and the moderate texture is a single cluster of pixels separate from all other groups of pixels that are scattered across the electronic image.

8. The method of claim 1, further comprising:

performing, by the processing device, a composition analysis on the electronic image, wherein the composition analysis comprises partitioning the electronic image into the plurality of segments or the plurality of parts;

combining, by the processing device, results of composition analysis, one or more edge detection results, and the plurality of segments or the plurality of parts to estimate a robustness of the plurality of segments or the plurality of parts and the visual significance.

9. The method of claim 1, further comprising constructing, by the processing device, an integrated differential composition significance map comprising an integrated differential significance score for each pixel based on the composition significance map and a texture analysis of the electronic image, wherein the significance score for each pixel is a composition significance score of a particular segment of the plurality of segments to which the pixel belongs, non-boundary pixels of a segment not adjacent to any pixel of another segment are assigned an integrated differential significance score of zero, and pixels on a boundary between two segments are assigned integrated differential significance scores that are the same as the composition significance score of the pixels and if a segmentation result is estimated to not be robust, then non-boundary pixels that locate on detected edges according to an edge map are assigned integrated differential significance scores that are the same as the composition significance scores of the pixels.

10. The method of claim 9, further comprising determining, by the processing device, a core region comprising faces or a particular segment of the plurality of segments having a highest significance score.

11. The method of claim 10, further comprising determining, by the processing device, a plurality of candidate cropped regions wherein each candidate of a plurality of candidates includes the core region and is assigned a merit score, the merit score being the sum of the integrated differential significance score of each pixel in a region of the plurality of candidate cropped regions.

12. The method of claim 11, further comprising:

selecting, by the processing device, a cropped region from the plurality of candidate cropped regions, wherein the cropped region comprises a highest merit score when cropping or scaling the electronic image; and performing, by the processing device, a series of adjustments that shift the selected cropped region to improve an aesthetic value of the cropped image.

13. The method of claim 10, wherein if a particular segment of the plurality of segments having a highest significance score is larger than a maximum allowed size of the cropped image, a portion of the segment is chosen based on a spatial arrangement of the segment.

14. A system for electronically assessing a visual significance of pixels or regions in an electronic image, the system comprising:

a processing device; and a non-transitory, processor-readable storage medium in communication with the processing device, wherein the non-transitory, processor-readable storage medium comprises one or more programming instructions stored thereon that, when executed, cause the processing device to:

construct an attributed composition graph comprising a plurality of nodes, wherein each node of the plurality of nodes corresponds to a segment of a plurality of segments of the electronic image or a part of a plurality of parts of the electronic image and wherein each node of the plurality of nodes comprises one or more attributes, model the visual significance of the electronic image based on the attributed composition graph using a statistical modeling process or a computational modeling process to obtain a plurality of values, and construct a composition significance map comprising a significance score for each segment of the plurality of segments or each part of the plurality of parts according to the values obtained from the statistical modeling process or the computational modeling process.

15. The system of claim 14, wherein the statistical modeling process utilizes a discrete Markov chain or a continuous Markov chain.

16. The system of claim 15, wherein each node of the plurality of nodes in the attributed composition graph is a state in the discrete Markov chain or the continuous Markov chain.

17. The system of claim 15, wherein:

an amount of time or proportion of time which a state in the discrete Markov chain or the continuous Markov chain occurs indicates a visual significance of the state; and the visual significance of the state is assigned to a corresponding segment of the plurality of segments or a corresponding part of the plurality of parts as the significance score.

18. The system of claim 15, wherein the Markov chain comprises a state that represents an area outside the electronic image.

19. A non-transitory, processor readable storage medium comprising one or more programming instructions that, when executed by a processing device, cause the processing device to:

construct an attributed composition graph comprising a plurality of nodes, wherein each node of the plurality of nodes corresponds to a segment of a plurality of segments of the electronic image or a part of a plurality of parts of the electronic image and wherein each node of the plurality of nodes comprises one or more attributes;

model the visual significance of the electronic image based on the attributed composition graph using a statistical modeling process or a computational modeling process to obtain a plurality of values; and construct a composition significance map comprising a significance score for each segment of the plurality of segments or each part of the plurality of parts according to the values obtained from the statistical modeling process or the computational modeling process.

20. The non-transitory, processor readable storage medium of claim 19, wherein the statistical modeling process utilizes a discrete Markov chain or a continuous Markov chain.

* * * * *